(12) United States Patent
Kanthasamy et al.

(10) Patent No.: US 10,546,420 B1
(45) Date of Patent: Jan. 28, 2020

(54) MAPPED MESHING METHOD AND MAPPED SEEDING METHOD

(71) Applicant: MSC.Software Corporation, Santa Ana, CA (US)

(72) Inventors: Kunaseelan Kanthasamy, Irvine, CA (US); Hongtao Xu, Irvine, CA (US)

(73) Assignee: MSC.SOFTWARE CORPORATION, Newport Beach, CA (US)

( * ) Notice: Subject to any disclaimer, the term of this patent is extended or adjusted under 35 U.S.C. 154(b) by 819 days.

(21) Appl. No.: 13/875,503

(22) Filed: May 2, 2013

(51) Int. Cl.
*G06F 17/50* (2006.01)
*G06T 17/20* (2006.01)

(52) U.S. Cl.
CPC .................... *G06T 17/20* (2013.01)

(58) Field of Classification Search
CPC ...................................... G06T 17/20
USPC .............................................. 703/1
See application file for complete search history.

(56) References Cited

U.S. PATENT DOCUMENTS

| | | | | |
|---|---|---|---|---|
| 5,315,537 A * | 5/1994 | Blacker | ................... | G06T 17/20 345/423 |
| 6,317,704 B1 * | 11/2001 | Furuhata | .................. | G06T 17/20 345/419 |
| 6,760,023 B2 * | 7/2004 | Hubeli | ................... | G06T 17/205 345/420 |
| 6,876,956 B1 * | 4/2005 | Cirak | .................. | G06F 17/5018 345/423 |
| 7,181,377 B1 * | 2/2007 | Borden | .................... | G06T 17/20 345/421 |
| 7,339,584 B1 * | 3/2008 | Shepherd | ................ | G06T 17/20 345/419 |
| 2002/0072884 A1 * | 6/2002 | El-Ratal | ................... | G06F 17/50 703/2 |
| 2003/0034970 A1 * | 2/2003 | Hubeli | ................... | G06T 17/205 345/420 |
| 2003/0112239 A1 * | 6/2003 | Shin | ......................... | G06T 17/20 345/428 |
| 2004/0194051 A1 * | 9/2004 | Croft | .................... | G06F 17/5018 703/2 |
| 2008/0052048 A1 * | 2/2008 | Onodera | ............. | G06F 17/5018 703/2 |

(Continued)

OTHER PUBLICATIONS

E. Subrahmanian, S. J. Fenves, S. Rachuri, R. D. Siriam, "Product lifecycle management support: A challenge in supporting product design and manufacturing in a networked economy" International Journal of Product Lifecycle Management, Jan. 2005, NIST, 23 pages.*

(Continued)

*Primary Examiner* — Dwin M Craig
(74) *Attorney, Agent, or Firm* — Foley & Lardner LLP

(57) ABSTRACT

Systems and methods for mesh generation for a model are disclosed. A mesh generation system may include a processing circuit configured to receive a surface geometry of a model, the surface geometry including more than one boundary node. The processing circuit is further configured to generate a finite element mesh of the model using the one or more boundary nodes of the surface geometry. The generation of the finite element mesh occurs via one of a mapped meshing method and a mapped seeding method. The mapped seeding method may be used when one or more fixed nodes are present in the model.

22 Claims, 10 Drawing Sheets

(56) References Cited

U.S. PATENT DOCUMENTS

2009/0213119 A1* 8/2009 Oh ..................... G06T 17/205
                                                              345/423

OTHER PUBLICATIONS

L. Wang, "Integration of CAD and boundary element analysis through subdivision methods" Computers & Industrial Engineering 57 (2009) pp. 691-698.*

* cited by examiner

MAPPED MESHING METHOD AND MAPPED SEEDING METHOD

BACKGROUND

The present disclosure generally relates to computer-aided engineering (CAE) systems. The present disclosure relates more specifically to mesh generation for a model created in a CAE system.

There are structured surface mesh generation methods for a surface geometry of a model designed using a system. For example, such methods may include domain vertex methods, transfinite interpolation (TFI) methods, and partial differential equation (PDE) mapping methods such as elliptic grid generation and hyperbolic grid generation methods. TFI methods may include interpolation using Lagrange polynomials, Hermite polynomials, spline functions, etc. TFI methods generally allows for mapping a transformed computational domain to a physical domain (e.g., a surface geometry of a model), enabling the method to generate a regular mesh with relatively curved sides.

SUMMARY

One embodiment of the present disclosure relates to a mapped meshing methods and systems. The method includes receiving a surface geometry of a model. The surface geometry includes more than one boundary node. The method further includes determining boundary edges of the surface geometry, and curvature information of each boundary edge. The method further includes calculating a plurality of node locations on each boundary edge using the curvature information. The method further includes determining a mesh adjustment based on the boundary edges to adjust the position of each node location in the surface geometry. The method further includes generating a finite element mesh using the node locations.

Another embodiment of the present disclosure relates to a mapped seeding method. The method includes receiving a surface geometry of a model. The surface geometry includes more than one boundary node and at least one fixed node on the surface geometry that is not a boundary node. The method further includes determining boundary edges of the surface geometry, and a boundary edge pair including two boundary edges of the surface geometry. The method further includes determining fixed node locations on each boundary edge of the boundary edge pair. The method further includes generating a node list for each boundary edge of the boundary edge pair, wherein the node list includes a list of boundary nodes and fixed nodes on the boundary edge. The method further includes mapping the nodes in the node list of a boundary edge of the boundary edge pair to the opposing boundary edge. The method further includes adding additional nodes to a boundary edge if a distance between two consecutive nodes in the node list is larger than a threshold value. The method further includes generating a finite element mesh using the node location of nodes in the node list.

Yet another embodiment of the present disclosure relates to a mesh generation system, including a processing circuit. The processing circuit is configured to receive a surface geometry of a model, the surface geometry including more than one boundary node. The processing circuit is further configured to generate a finite element mesh of the model using the one or more boundary nodes of the surface geometry. The generation of the finite element mesh occurs via one of a mapped meshing method and a mapped seeding method.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Figure 1:
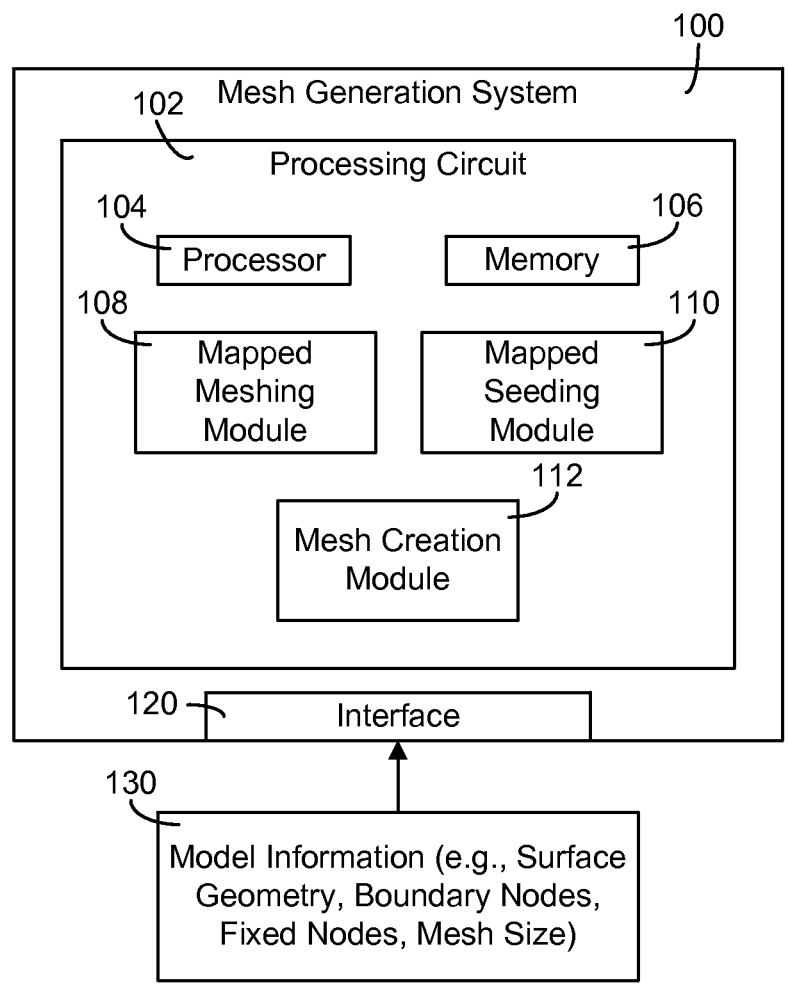
FIG. 1 is a block diagram of a mesh generation system, according to an exemplary embodiment.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Referring generally to the figures, systems and methods for mesh generation for a surface geometry of a model are shown and described. The systems and methods herein may receive a model designed using a CAE system along with model information such as the surface geometry of the model, a preferred mesh size for the model, and node information (i.e. node location within an object). The systems and methods herein may be used to generate a finite element mesh for the surface geometry of the model. The mesh is a finite element representation of the original geometry of the model. The finite element mesh is used for finite element analysis or for other purposes in the CAE system. The systems and methods herein may generate improved mapped meshes on the surface geometry (i.e., the mesh regularity is increased). A better mesh quality improves the results of the finite element analysis. A better mesh quality may be a smooth, uniform or a more symmetrical mesh that is creates more accurate results compared to an irregular mesh.

In general, surface meshing methods may be classified as either unstructured mesh generation methods or structured mesh generation methods. An unstructured meshing algorithm may generate an irregular and undesirable mesh on an irregular surface geometry. A structured meshing algorithm may generate a regularly shaped mesh but may be unsuitable for irregularly shaped geometry. The mapped meshing method and mapped seeding method described herein may be configured to generate a regular mesh shape for more irregular surface geometries. The regular mesh is a symmetrical mesh.

A mapped meshing method or mapped seeding method may be used to generate a mesh for a surface geometry of a model. The mapped meshing method may be configured to generate a mesh for a surface geometry of a model, such as a four-sided surface geometry in one embodiment. The mapped seeding method may be configured to generate a mesh for a surface geometry of a model when the surface geometry includes one or more randomly located nodes on the edges of the geometry. The mapped seeding method may be used when there are random fixed points located in the model, in order to keep the same number of nodes on opposite sides on the model.

The mapped meshing method is a structured meshing method that receives a four-sided surface geometry of a model as an input in one embodiment. The mapped meshing method is generally configured to generate the same number of nodes (e.g., seeds) on opposite edges of the surface geometry in one embodiment. The nodes or seeds are then used to generate the finite element mesh. In one embodiment, generating the same number of nodes on opposite edges allows the mapped meshing method is capable of generating a uniform mesh regardless of the curvature of any edge of the surface geometry.

The mapped seeding method is a meshing method that is configured to generate a mesh on a surface geometry with any number of "hard points" (e.g., nodes that are on an edge or curve of the surface geometry, but are not an endpoint of an edge or curve, or do not break the edge or curve into two separate and distinct curves). The mapped seeding method may be used when the presence of the fixed nodes indicates that nodes cannot be automatically generated in one embodiment. For example, the mapped meshing method may be used when there are no fixed nodes, or when the fixed nodes fail to interfere with the creation of additional nodes for the surface geometry. The mapped seeding method may be used when the presence of the fixed nodes complicates the placement of the additional nodes.

Referring now to FIG. 1, a block diagram of a mesh generation system 100 is shown, according to an exemplary embodiment. Mesh generation system 100 may generally be part of a CAE system or computer-aided design (CAD) system. Mesh generation system 100 may be generally configured to receive a model being designed using the CAE system or CAD system. The model may be designed by a user of the CAE system or CAD system, and may include any number of modifications. Mesh generation system 100 may receive the model and generate a finite element mesh for the model based on the surface geometry of the model and other user-defined properties (e.g., a desired mesh size that indicates a desired level of detail of the mesh).

Mesh generation system 100 is shown to include a processing circuit 102 including a processor 104 and memory 106. Processor 104 may be implemented as a general purpose processor, an application specific integrated circuit (ASIC), one or more field programmable gate arrays (FPGAs), a group of processing components, or other suitable electronic processing components. Memory 106 is one or more devices (e.g., RAM, ROM, Flash memory, hard disk storage, etc.) for storing data and/or computer code for completing and/or facilitating the various processes described herein. Memory 106 may be or include non-transient volatile memory or non-volatile memory or non-transitory computer readable storage media. Memory 106 may include database components, object code components, script components, or any other type of information structure for supporting the various activities and information structures described herein. Memory 106 may be communicably connected to processor 104 and includes computer code or instructions for executing one or more processes described herein.

Mesh generation system 100 is shown to include an interface 120 configured to receive model information 130 from the CAE system. Model information 130 may include a surface geometry of the model, boundary nodes of the model (e.g., nodes that are endpoints of an edge of the surface geometry or nodes that separate two curves or edges of the surface geometry), other fixed nodes of the model (e.g., fixed points on the edges of the surface geometry that help define the shape of the surface geometry), and a mesh size (e.g., a user-defined size that indicates a level of detail of the to-be-generated mesh). Interface 120 may further be configured to receive any type of user input or other input related to the mesh generation process.

Processing circuit 102 is shown to include various modules for executing the activities described herein. Processing circuit 102 includes a mapped meshing module 108 configured to execute a mapped meshing method for a surface geometry of a model. Mapped meshing module 108 may receive model information 130 such as the surface geometry of the model and the boundary nodes of the model. In some embodiments, the model includes a four-sided surface geometry and may include four boundary nodes defining the edges of the surface geometry. Mapped meshing module 108 is configured to generate a finite element mesh for the surface geometry.

Mapped meshing module 108 may receive or determine the boundary nodes and boundary edges of the surface geometry. Module 108 may determine a curvature of each boundary edge to determine how to add additional nodes to the boundary edges of the model. For example, module 108 may determine if an edge is curved or not curved by comparing the distance between the boundary nodes to the distance between the surface convex hull of the edges.

Based on the curvature, module 108 may be configured to generate additional nodes on the boundary edges of the model. For example, if none of the boundary edges are curved, module 108 may calculate intersection points on the boundary edges where nodes may be inserted. The intersection points may be calculated based on the slopes of the edges. In yet another embodiment, when the boundary edges are curved, one or more interpolation methods may be used to calculate the location of the additional nodes.

Module 108 may further be configured to calculate a mesh adjustment for the nodes of the model. For example, for a curved boundary edge of the model, module 108 may be configured to calculate an adjustment for each node located on the boundary edge. After applying the mesh adjustment, a finite element mesh may be generated using the node locations by module 108 or by mesh creation module 112.

Processing circuit 102 includes a mapped seeding module 110 configured to execute a mapped seeding method for a surface geometry of a model. Mapped seeding module 110 may receive model information 130 such as the surface geometry of the model, boundary nodes of the model, and at least one fixed node of the model. In one embodiment, the model includes a four-sided surface geometry and may include four boundary nodes defining the sides of the surface geometry and at least one fixed node located on a boundary edge of the surface geometry. Mapped seeding module 110 is configured to generate a finite element mesh for the surface geometry.

Mapped seeding module 110 may receive or determine the boundary nodes, boundary edges, and fixed nodes of the surface geometry. Module 110 may further determine boundary edge pairs. A boundary edge pair may be a pair of opposing boundary edges in the surface geometry. Module 110 may generate a node list including boundary nodes and fixed nodes located on each boundary edge of the boundary edge pair. Using the node list, module 108 may map the nodes to a position on its corresponding opposing boundary edge. By mapping the nodes, both boundary edges in the boundary edge pair may then include the same number of nodes.

Module 110 may further add additional nodes to each boundary edge in a boundary edge pair. For example, module 110 may receive a specified mesh size (e.g., 1 cm, 1 nanometer, 1/16 inch, etc.) from a user creating the model. Additional nodes may be added to each boundary edge such that each segment of a boundary node defined by two nodes is smaller than the specified size. After adding additional nodes, a finite element mesh may be generated using the node locations by module 110 or by mesh creation module 112.

Processing circuit 102 may, upon receiving model information 130, determine how to generate a finite element mesh for the model. For example, processing circuit 102 may determine whether to use a mapped meshing method or mapped seeding method to generate the finite element mesh. In another embodiment, the mapped seeding method may generate output that is used by the mapped meshing method. In one embodiment, if the model includes at least one fixed node, processing circuit 102 may use mapped seeding module 110 to generate the mesh. Otherwise, mapped meshing module 108 may be used to generate the mesh.

In one embodiment, processing circuit 102 may include a mesh creation module 112 configured to generate a mesh for a surface geometry using a list of nodes and node locations for the model. In other embodiments, modules 108, 110 may be configured to create the mesh using the list of nodes and node locations.

Figure 2:
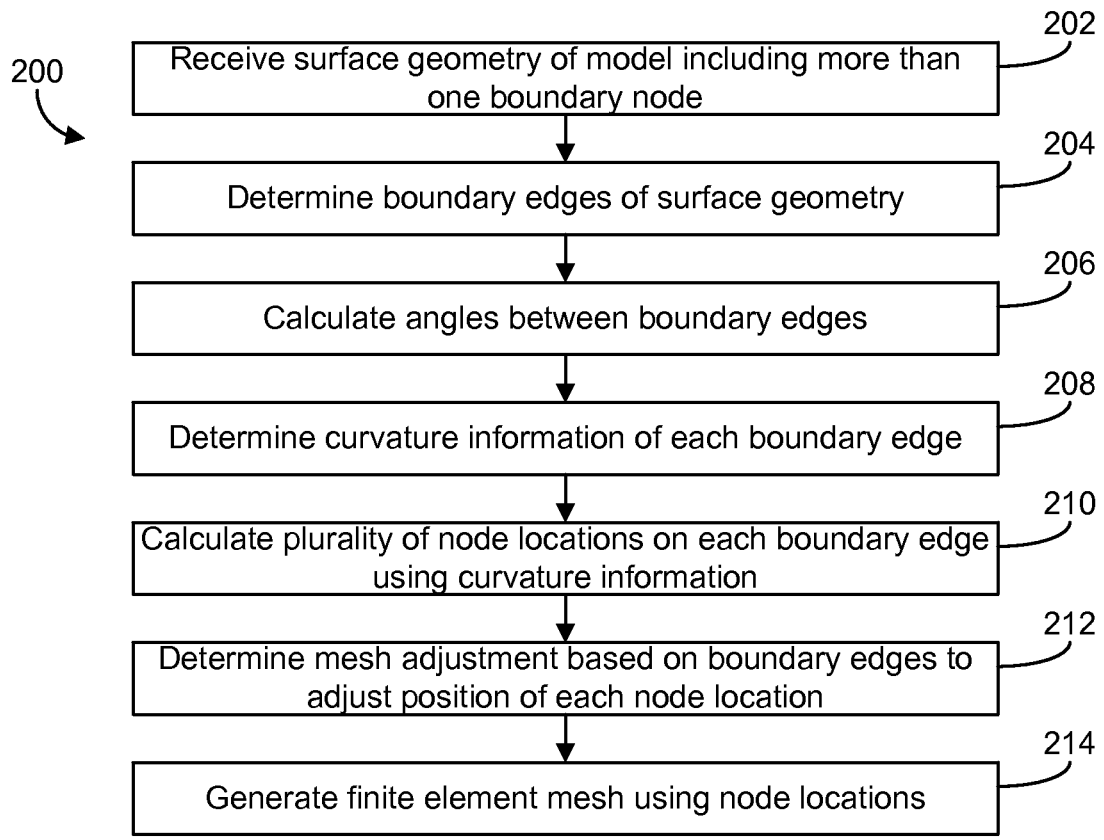
FIG. 2 is a flow chart of a mapped meshing process for generating a mesh for a model, according to an exemplary embodiment.

Referring now to FIG. 2, FIG. 2 is a flow chart of a mapped meshing process 200 for generating a mesh for a model according to an exemplary embodiment. Process 200 may be executed by, for example, mapped meshing module 108. Process 200 includes receiving model information such as a surface geometry and more than one boundary node (step 202). For example, step 202 may generally include receiving a four-sided surface geometry of a model, including four boundary nodes. The boundary nodes may be determined during model creation by a user or the CAE system, or the boundary nodes may be determined by mapped meshing module 108. In one embodiment, the boundary nodes may be determined by an API function of the CAE system. Process 200 further includes determining boundary edges of the surface geometry (step 204). For example, step 204 may include determining the four boundary edges of a four-sided surface geometry based on the boundary nodes.

Process 200 further includes calculating angles between boundary edges (step 206). The calculated angles may be used to determine whether the mapped meshing method may generate a mesh. For example, when the angle between two adjacent boundary edges is equal or close to 0 degrees or 180 degrees, it may be determined that the mesh that the mapped meshing method may generate may be irregular (or unsymmetrical) for use in finite element analysis. If the angles indicate that a mesh cannot be generated, process 200 may terminate at step 206.

Process 200 further includes determining curvature information of each boundary edge (step 208) and calculating a plurality of node locations on each boundary edge using the curvature information (step 210). Steps 208, 210 may generally include determining if a boundary edge is curved or linear, and calculating node locations on the boundary edge based on interpolation techniques on the curve or a linear slope. Steps 208, 210 are described in greater detail in FIG. 3. As a result of steps 208, 210, a list of nodes and node locations are generated for each boundary edge.

Process 200 further includes determining a mesh adjustment based on the boundary edges (step 212). The mesh adjustment may be used to adjust the position of each node location for each boundary edge of the surface geometry. After generating nodes and node locations in steps 208, 210, the positions of the nodes may need to be adjusted to fit within the model. Step 212 is described in greater detail in FIG. 4. After the mesh adjustment is applied, a finite element mesh may be generated using the new node locations (step 214).

Figure 3:
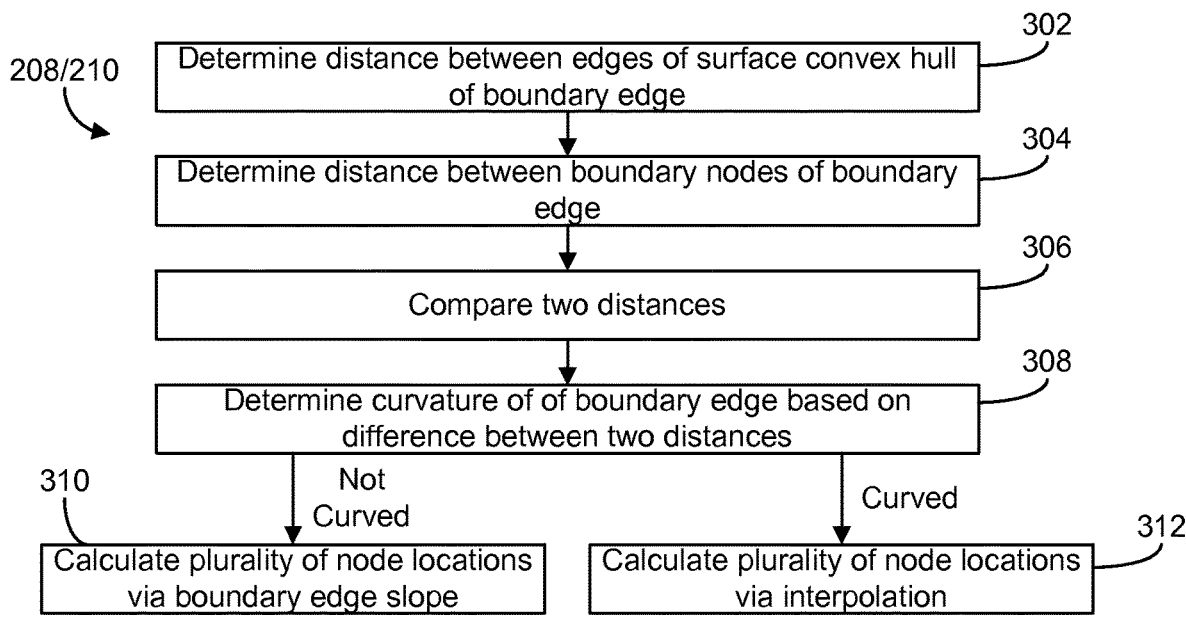
FIG. 3 is a flow chart of a process for calculating node locations in a mapped meshing process, according to an exemplary embodiment.

Referring now to FIG. 3, steps 208, 210 of calculating node locations in a mapped meshing process are shown in greater detail. Steps 208, 210 generally include determining a curvature of a boundary edge and calculating node locations based on the curvature in some embodiments. A distance between the edges of the surface convex hull of a boundary edge may be calculated (step 302). For example, for a boundary edge including two boundary nodes and any number of other nodes, a convex hull of the boundary edge may be defined as a convex set (e.g., a space) such that all nodes are contained within the convex set. The distance between the edges of the surface convex hull may then be representative of the size of the convex set. The edges of the surface convex hull are edges around each boundary node of the boundary edge. If the boundary edge is curved, the convex set may be larger in order to encompass all nodes of the boundary edge, and therefore the distance between the edges of the convex hull is greater.

A distance between two boundary nodes of the boundary edge may also be determined (step 304). If the boundary edge is linear, the distance represents the length of the boundary edge; if the boundary edge is curved, the distance is smaller than the length of the boundary edge.

The two distances may be compared (step 306) and a curvature of a boundary edge may be determined based on the difference between the two distances (step 308). For example, if the boundary edge is linear in shape, the distance between the edges of the convex hull will be similar to the distance between boundary nodes of the boundary edges, since the edges of the convex hull will be nearer to the boundary edges. If the boundary edge is curved, the edges of the convex hull will be farther away from the boundary edges, creating a larger distance than the distance between the two boundary nodes.

If a boundary edge is not curved, a plurality of node locations may be calculated on the boundary edge (step 310). The number of node locations may vary based on a desired mesh size (e.g., enough nodes are placed on the boundary edge to create the proper mesh size). The node locations may be calculated using the slopes of the boundary edge and the opposing boundary edge. For example, the slopes of the boundary edges may be used to determine a node location relative to another node location, and the method may be repeated until enough node locations are determined to create the desired mesh size.

If the boundary edge is curved, a plurality of node locations may be calculated on the boundary edge using interpolation techniques (step 312). In one embodiment, a linear interpolation technique may be used that fits the curve of the boundary edge to a linear polynomial. Node locations on the boundary edge may be chosen using linear interpolation. In other embodiments, other interpolation techniques may be used for non-linear boundary edges.

Figure 4:
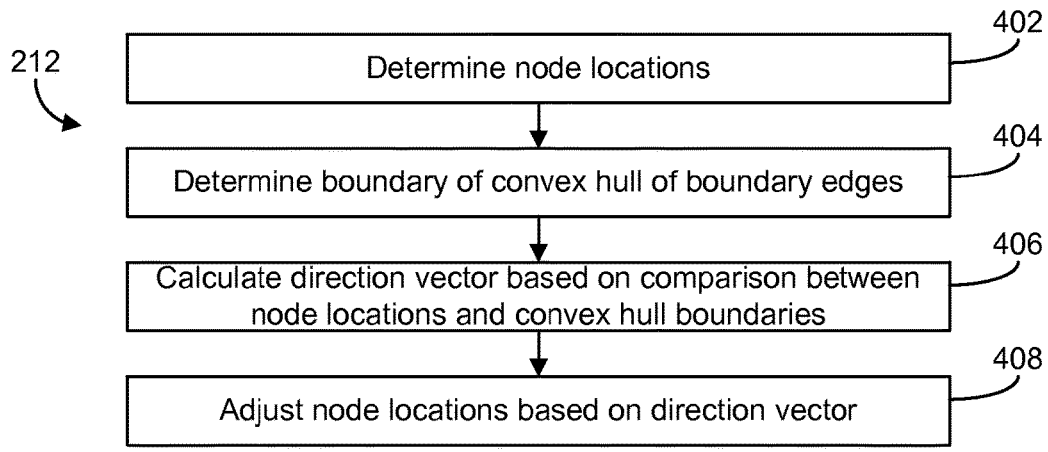
FIG. 4 is a flow chart of a process for determining mesh adjustments in a mapped meshing process, according to an exemplary embodiment.

Referring now to FIG. 4, step 212 of determining a mesh adjustment is shown in greater detail. Current node locations are determined (step 402). The node locations may be determined via, for example, step 210 of process 200. Boundaries of the convex hull of the boundary edges may be determined (step 404). As described above, the convex hull of a boundary edge is a convex set or space containing all nodes of the boundary edge, and step 404 includes determining the boundaries of the convex hull.

A direction vector may be calculated based on a comparison between the node locations and the convex hull boundaries (step 406). For example, for a node, a location deviation may be calculated for a node that represents a displacement of the node from the boundary edge. A direction vector may be calculated based on the location deviation and a pre-calculated point on the boundary of the convex hull. In other words, using the convex hull boundary, step 406 may be used to ensure that nodes fall within the surface geometry of the model. The node locations are adjusted based on the direction vector (step 408).

Figure 5C:
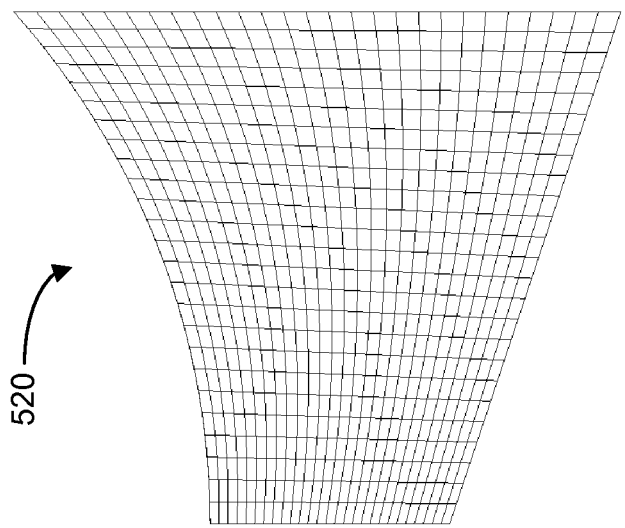
FIGS. 5A-C illustrate a surface geometry and a generated mesh for the surface geometry, according to an exemplary embodiment.
Figure 5B:
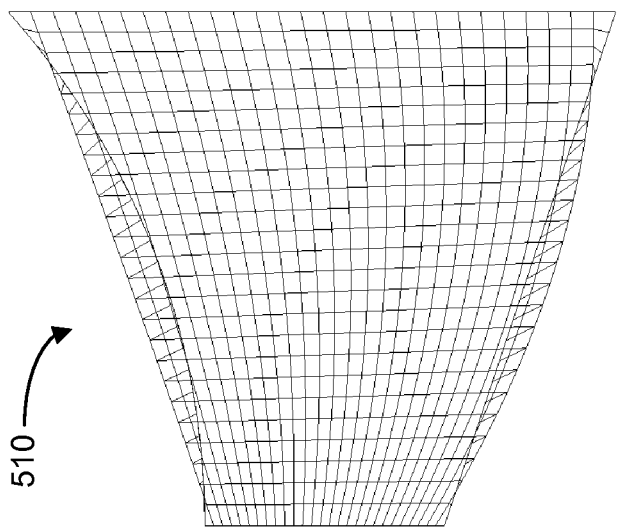
Figure 5A:
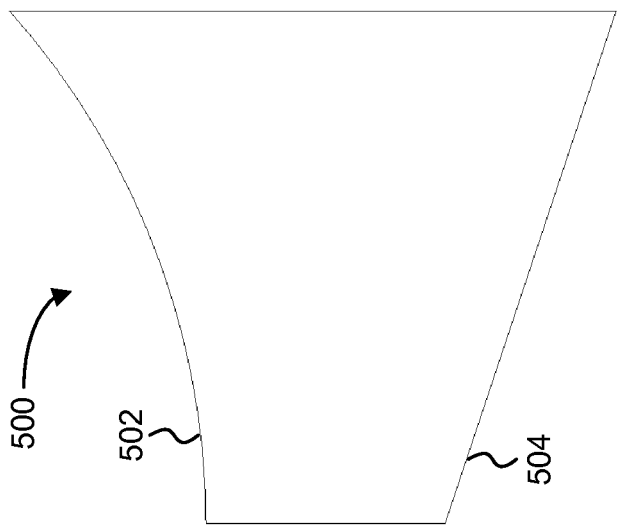

Referring generally to FIGS. 5A-C, example mesh generations are illustrated. In FIG. 5A, surface geometry 500 for a model is shown. Surface geometry 500 include two curved boundary edges 502, 504. In FIG. 5B, mesh 510 may be generated by a traditional mesh generation method. Due to the presence of boundary edges 502, 504, many node locations that are supposed to be on boundary edges 502, 504 are shown located outside of the surface geometry. In FIG. 5B, using the mapped meshing method, mesh 520 may be generated in which each node location falls on the surface geometry.

Figure 6A:
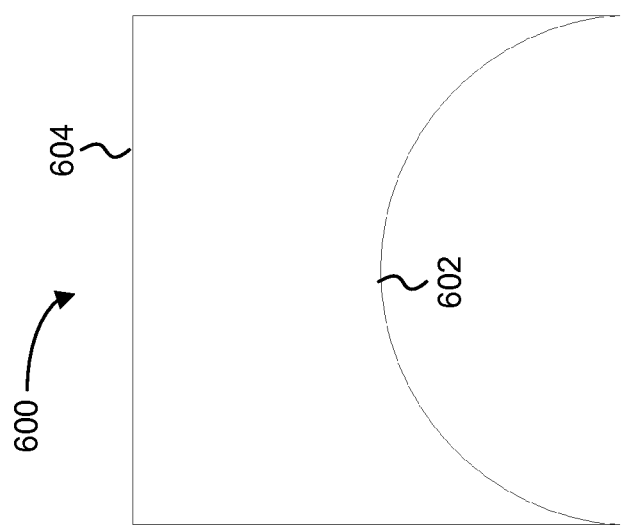
FIGS. 6A-6C illustrate a surface geometry and a generated mesh for the surface geometry, according to an exemplary embodiment.
Figure 6B:
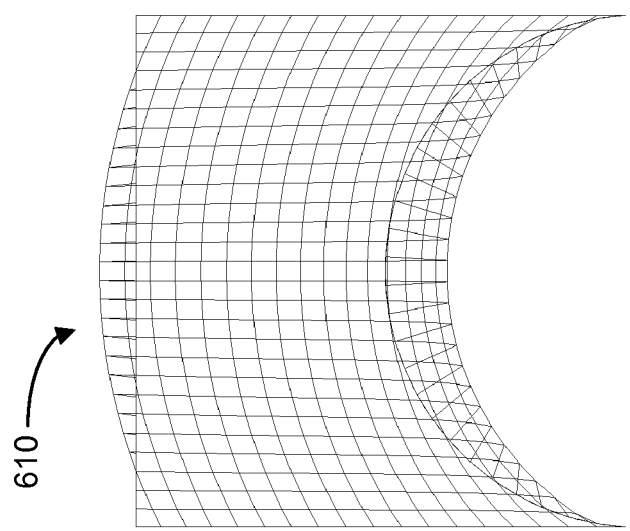
Figure 6C:
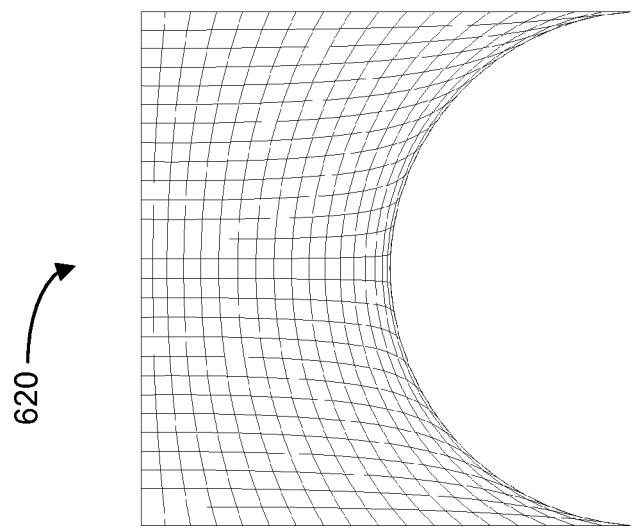

Referring generally to FIGS. 6A-6B, further example mesh generations are illustrated. In FIG. 6A, surface geometry 600 includes one curved boundary edge 602. In FIG. 6B, mesh 610 may be generated by a traditional mesh generation method. Due to the presence of curved boundary edge 602, boundary nodes on the opposite boundary edge 604 are shown creating a curved shape, resulting in a deformed and inaccurate mesh. In FIG. 6C, using the mapped meshing method, mesh 620 may be generated in which the shape of the opposing boundary edge 604 is maintained.

Figure 7C:
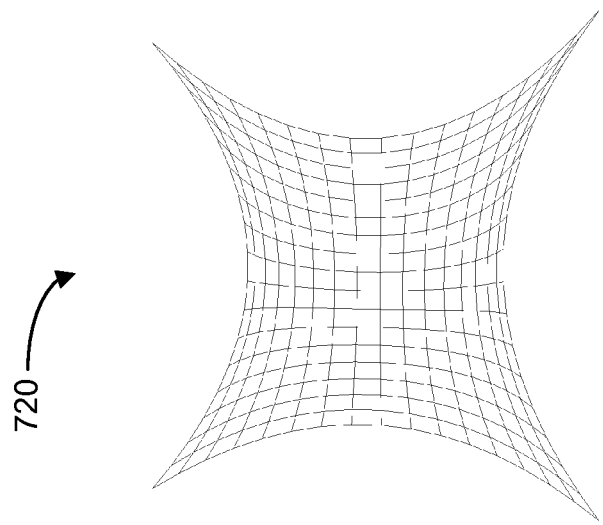
FIGS. 7A-7C illustrate a surface geometry and a generated mesh for the surface geometry, according to an exemplary embodiment.
Figure 7B:
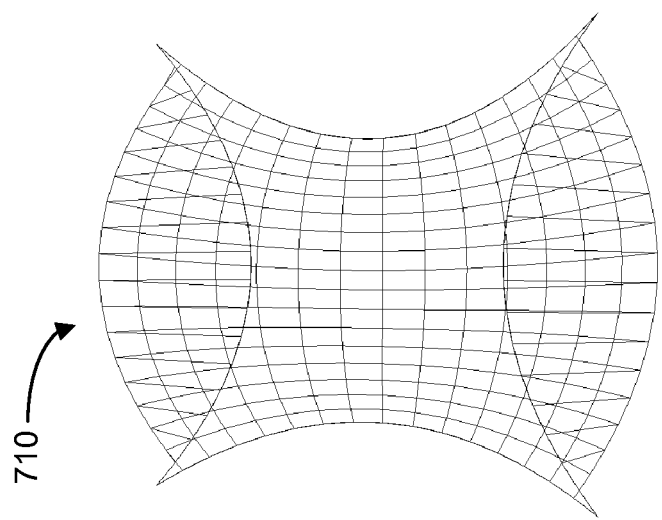
Figure 7A:
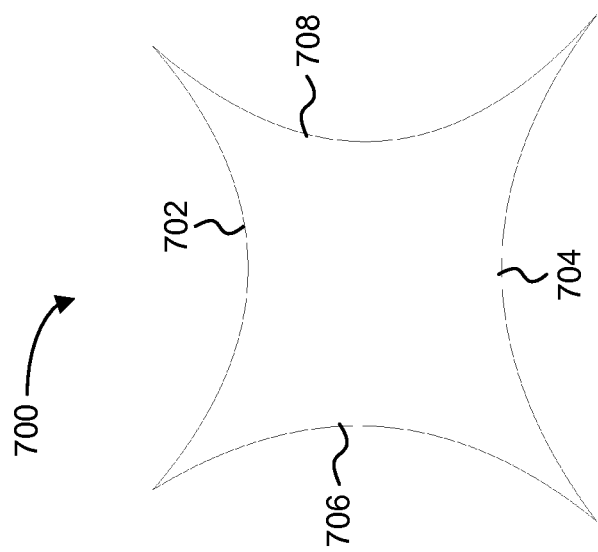

Referring generally to FIGS. 7A-7B, further example mesh generations are illustrated. In FIG. 7A, surface geometry 700 includes four curved boundary edges 702, 704, 706, 708. In FIG. 7B, mesh 710 may be generated by a traditional mesh generation method. Due to the presence of curved boundary edges 702, 704, 706, 708, many boundary nodes fall outside of the surface geometry of the model. In FIG. 7C, using the mapped meshing method, mesh 720 may be generated.

Figure 8A:
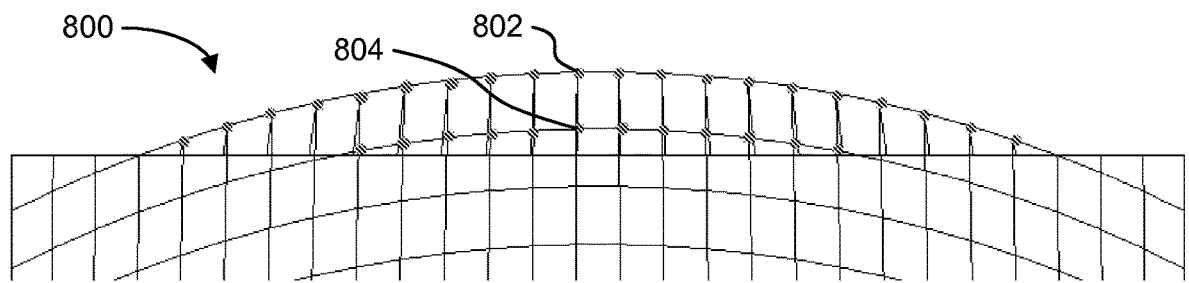
FIGS. 8A-8B illustrate a surface geometry and a generated mesh for the surface geometry, according to an exemplary embodiment.
Figure 8B:
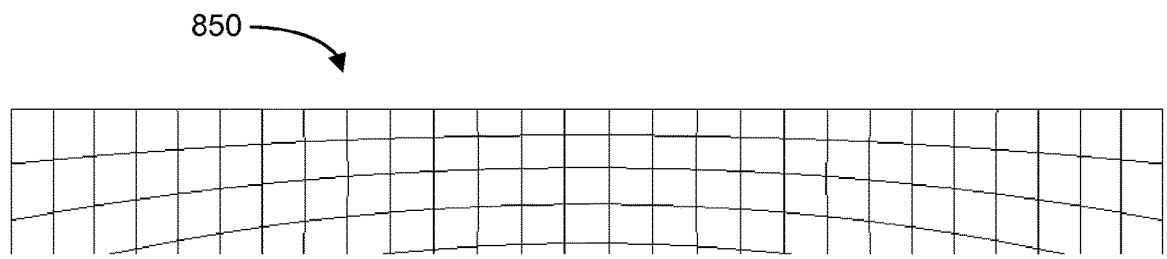

In FIGS. 8A-8B, the mesh of FIGS. 6B-C are shown with greater detail. In FIG. 8A and mesh 800, boundary node 802 is shown outside of the surface geometry. Further, an interior node 804 of the surface geometry is shown outside of the surface geometry. In FIG. 8B, mesh 850 is shown in which the boundary node is on the boundary edge and the interior nodes are within the surface geometry. The mapped meshing method is configured to adjust node positions (see FIG. 4) such that boundary node 802 and interior node 804 are properly placed in the mesh.

Figure 9:
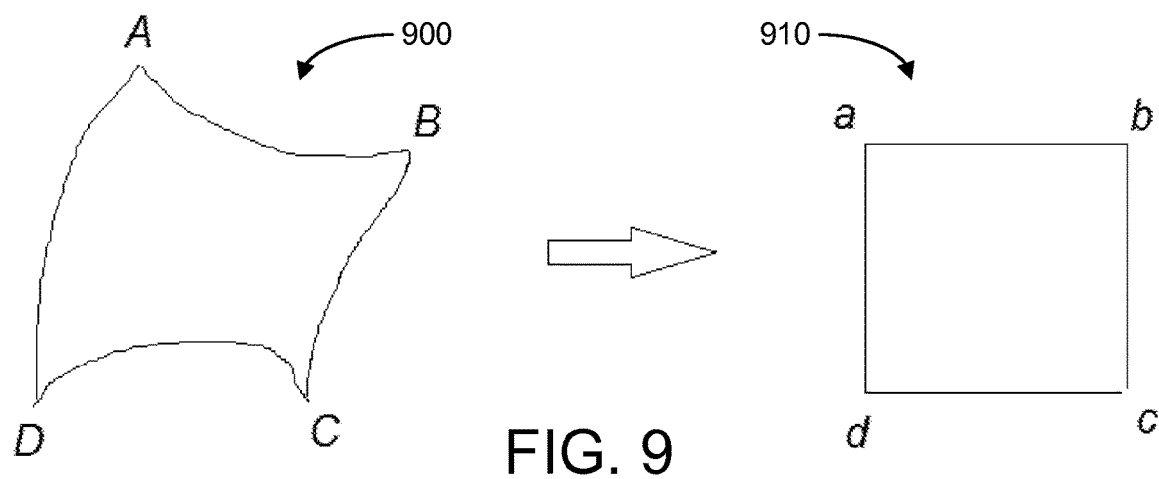
FIG. 9 is an illustration of a domain mapping in a mapped meshing process, according to an exemplary embodiment.

Referring to FIG. 9, an illustration of domain mapping in a mapped meshing process is shown. In the mapped meshing method, each side (e.g., AB, BC, CD, DA) can be mapped to a computational domain (e.g., to sides ab, bc, cd, da).

Figure 10:
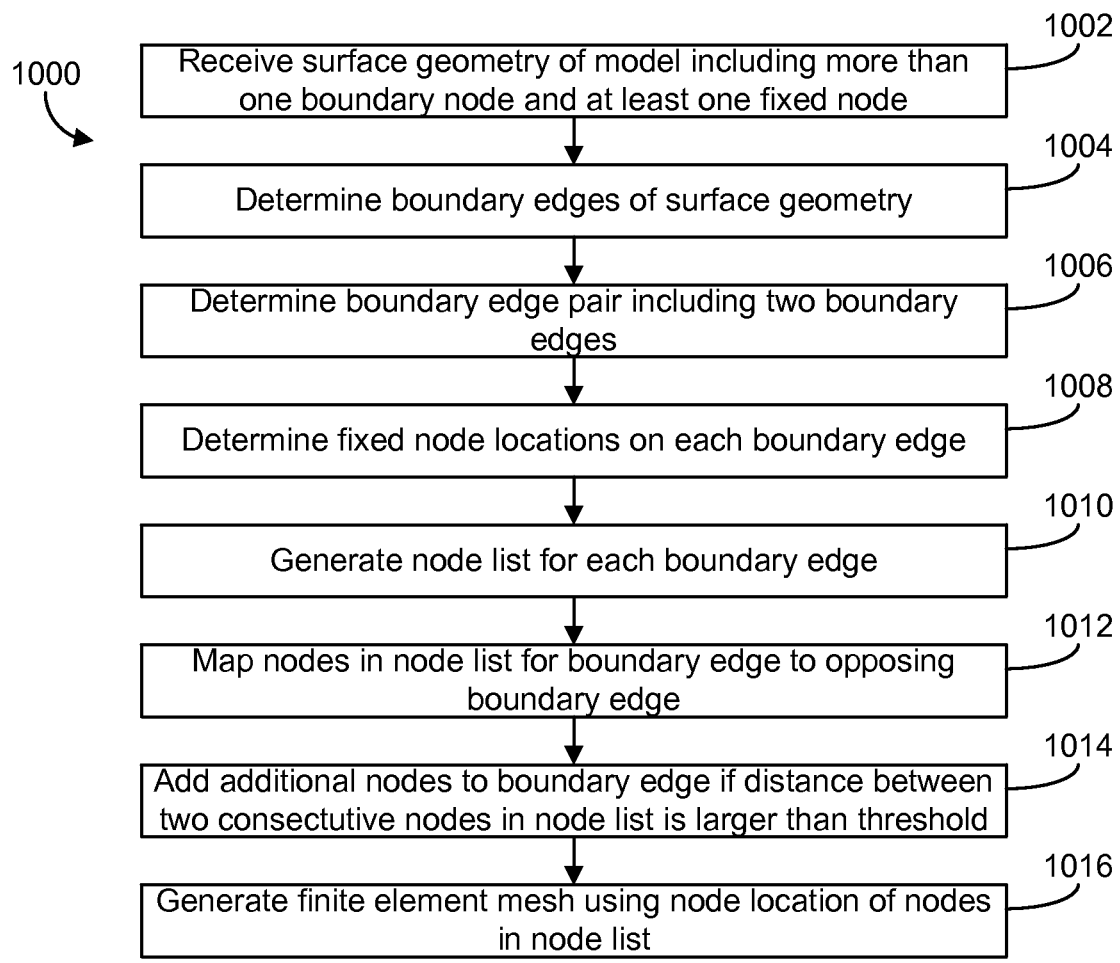
FIG. 10 is a flow chart of a mapped seeding process for generating a mesh for a model, according to an exemplary embodiment.

Referring now to FIG. 10, a flow chart of a mapped seeding process 1000 for generating a mesh for a model is shown, according to an exemplary embodiment. Process 1000 may be executed by, for example, mapped seeding module 110. Process 1000 may be used when there are one or more fixed or hard nodes on the surface geometry. A fixed node may be a non-boundary node on the surface geometry that is placed in the model by a user designing the model. Each fixed node is used as a node in the mapping process, thereby guaranteeing that the user-created geometry is respected.

In a mapped seeding process, the process cannot consider a single curve alone. The process needs to consider each pair of opposite edges of the model, so that the same number of nodes for each edge may be generated. The process may further be used to generate a mapped mesh without user input. For example, a user may have to otherwise manually move or edit fixed nodes in the model before generating the mesh.

Figure 12A:
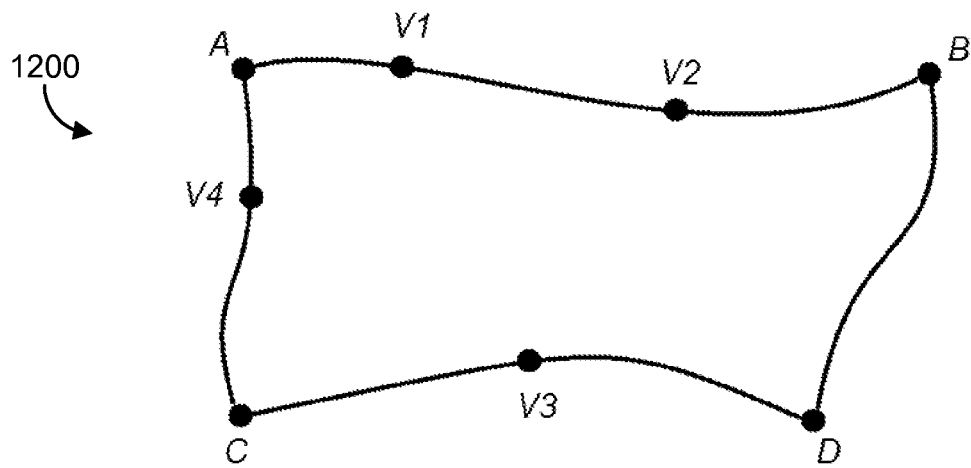
FIGS. 12A-C illustrate a mapped seeding process, according to an exemplary embodiment.

Process 1000 includes receiving model information such as a surface geometry and more than one boundary node and at least one fixed node (step 1002). For example, step 1002 may generally include receiving a four-sided surface geometry of a model, including four boundary nodes. A user or the CAE system may define the boundary nodes during the model creation process, or the boundary nodes may be determined by mapped seeding module 110. In one embodiment, the boundary nodes may be determined by an API function of the CAE system. Referring also to surface geometry 1200 of FIG. 12A, step 1002 may include identifying A, B, C, and D as boundary nodes.

Process 1000 further includes determining boundary edges of the surface geometry (step 1004). For example, step 204 may include determining the four boundary edges of a four-sided surface geometry based on the boundary nodes. Referring also to surface geometry 1200 of FIGS. 12A, AB, BD, CD, and CA may be identified as boundary edges. Process 1000 further includes determining boundary edge pairs including two boundary edges (step 1006). For example, referring to surface geometry 1200, boundary edges AB and CD may be identified as a boundary edge pair. Process 1000 further includes identifying the fixed node locations on each boundary edge (step 1008). For example, in surface geometry 1200, fixed nodes V1, V2 are identified for boundary edge AB and fixed node V3 for boundary edge CD.

Figure 12B:
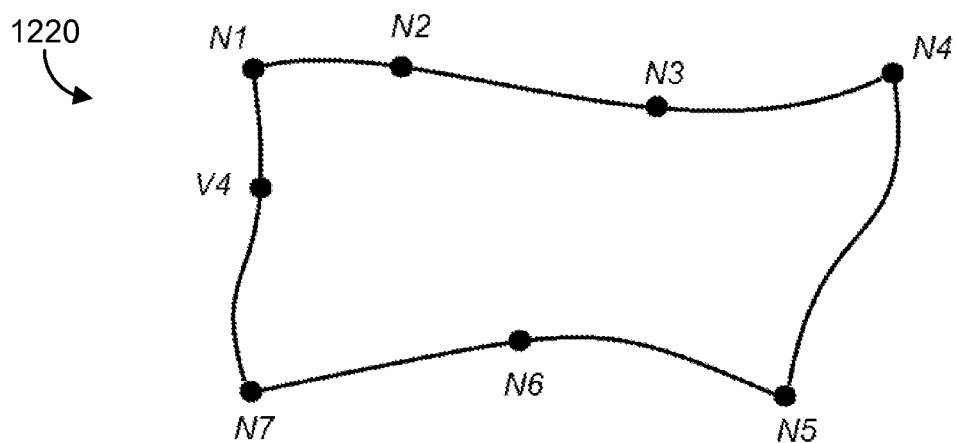

Process 1000 further includes generating a node list for each boundary edge of the boundary edge pair (step 1010). For example, referring to surface geometries 1200, 1220 of FIGS. 12A-B, for boundary edge AB, A, V1, V2, and B are added to a node list as nodes N1, N2, N3, and N4, respectively. For boundary edge CD, a node list N7, N6, and N5 are generated for nodes C, V3, and D, respectively. The starting point for the node list for each boundary edge may be on the same side, and the list order may be the same for both boundary edges.

Figure 12C:
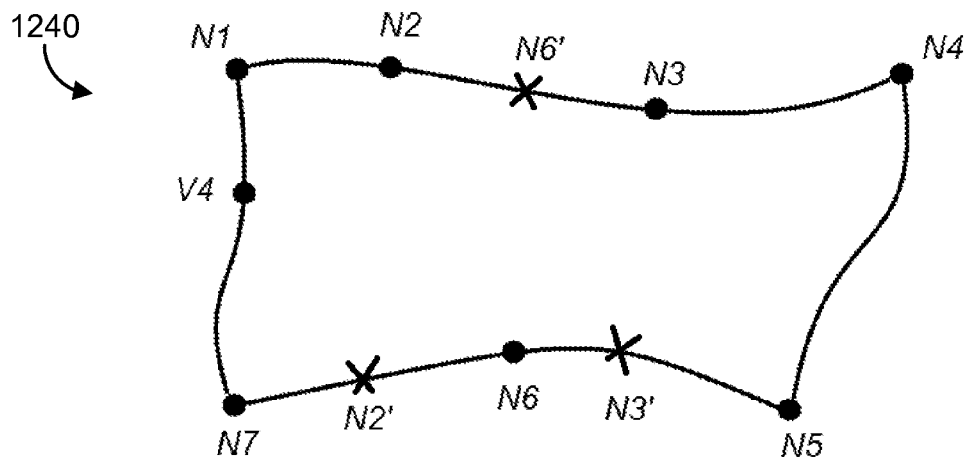

Process 1000 further includes mapping nodes in each node list for each boundary edge to the opposing boundary edge (step 1012). For example, referring to surface geometries 1220, 1240 of FIGS. 12B-C, step 1012 includes mapping node N6' to boundary edge AB and mapping nodes N2', N3' to boundary edge CD. The newly mapped nodes may further be added to the node list in the appropriate order (e.g., inserting node N6' in between N2 and N3 on the node list for boundary edge AB). Both boundary edges in the boundary edge pair therefore has the same number of nodes.

Process 1000 further includes adding additional nodes to a boundary edge if a distance between two consecutive nodes in the node list is larger than a given threshold (step 1014). The given threshold may relate to a given mesh size (e.g., a mesh size specified by a user). For example, a distance between nodes N1, N2 may be compared to a given threshold. If the distance is greater than the threshold, a node may be inserted in between N1 and N2. If a node is not inserted, when a finite element mesh is eventually generated, the mesh may not be as detailed as the user desires. The addition of new nodes in between N1, N2 may create a level of detail in the mesh desired by the user. Step 1014 is described in greater detail in FIG. 11. Step 1014 may further include adding the additional nodes to the node lists in the appropriate order. After adding the additional nodes to the node lists, process 1100 further includes generating a finite element mesh using the node locations of nodes in the node list (step 1016).

Figure 11:
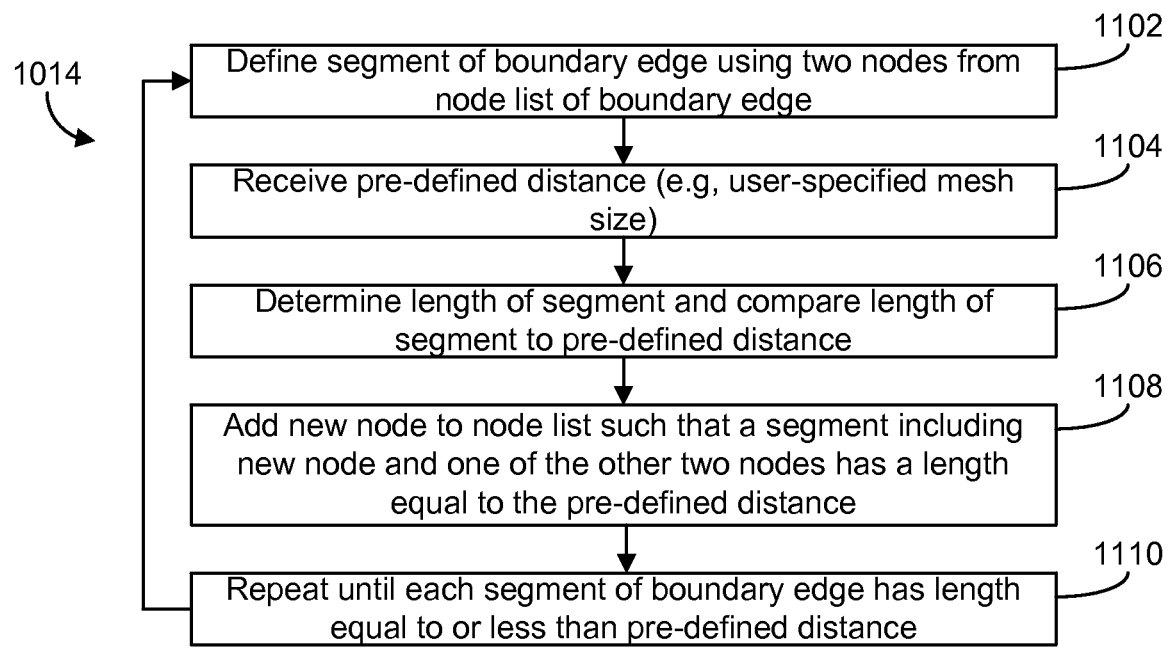
FIG. 11 is a flow chart of a process for adding nodes in a mapped seeding process, according to an exemplary embodiment.

Referring to FIG. 11, step 1014 of adding nodes in a mapped seeding process is shown in greater detail. Step 1014 may be applied for each segment of each boundary edge of a model. The step includes defining a segment of a boundary edge using two consecutive nodes from the node list of the boundary edge (step 1102). For example, referring to surface geometry 1240, the segment defined by nodes N1, N2 may be selected. A pre-defined distance may be received (step 1104). The pre-defined distance may relate to a desired mesh size (e.g., a user-specified mesh size).

The length of the segment may be determined, and the length may be compared to the pre-defined distance (step 1106). For example, the length of segment N1, N2 may be determined and compared to the pre-defined distance. If the length of segment N1, N2 is less than the distance, then a mesh of sufficient detail may be generated using nodes N1, N2, without an additional node in between N1, N2 for an additional line.

If the length of segment N1, N2 is greater than the distance, then a node needs to be inserted in between N1, N2, to add a level of detail to the mesh. A new node may be added to the node list such that a segment including the new node and one of the other two nodes has a length equal (or less than) to the pre-defined distance (step 1108). For example, a new node may be inserted in between nodes N1, N2 such that the length of the segment defined by the new node and node N1 is equal to or less than the distance. The new node may be added to the node list in the appropriate spot in the list.

The step may repeat until each segment of each boundary edge of the boundary edge pair has a length equal to or less than the pre-defined distance (step 1110). For example, after adding a new node in between nodes N1, N2 such that the length of the segment defined by the new node and node N1 is equal to the distance, the length of the segment defined by the new node and node N2 may be determined and compared to the distance, and another new node may be created if the length is greater than the distance.

The terms "module", "system", "logic", "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing, and grid computing infrastructures.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, networked systems or by a hardwired system.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. The machine-executable instructions may be executed on any type of computing device (e.g., computer, laptop, etc.) or may be embedded on any type of electronic device (e.g., a portable storage device such as a flash drive, etc.).

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A mapped meshing method, comprising:
receiving a surface geometry of a model, the surface geometry including more than one boundary node, wherein the model is designed by a user using a Computer-Aided Engineering (CAE) system or a Computer-Aided Design (CAD) system;
determining boundary edges of the surface geometry;
determining curvature information of each boundary edge;
calculating a plurality of node locations on each boundary edge using the curvature information;
determining a mesh adjustment based on the boundary edges to adjust a position of each node location in the surface geometry;
generating a finite element mesh using the node locations; and
performing a CAE finite element analysis using the finite element mesh, wherein the CAE finite element analysis is performed by the CAE system.

2. The method of claim 1, further comprising:
determining a failure to generate a finite element mesh based on angles between boundary edges of the surface geometry.

3. The method of claim 1, wherein determining the curvature information for a boundary edge comprises:
comparing distance between edges of a surface convex hull of the boundary edge and distance between boundary nodes of the boundary edge; and
determining that the boundary edge is curved if a difference in distance is greater than a threshold value.

4. The method of claim 3, further comprising:
determining that a curvature of a boundary edge is less than a given threshold; and
calculating the plurality of node locations on the boundary edge by using the slope of the boundary edge.

5. The method of claim 3, further comprising:
calculating the plurality of node locations on the boundary edges via interpolation techniques.

6. The method of claim 1, wherein determining the mesh adjustment based on the boundary edges comprises:
calculating a direction vector for each node location relative to a boundary of a convex hull of the boundary edges;
adjusting each node location based on the direction vector.

7. The method of claim 1, wherein the finite element mesh is displayed to the user.

8. The method of claim 1, wherein the finite element analysis is performed during a design process for the model.

9. A mapped seeding method, comprising:
receiving a surface geometry of a model, the surface geometry including more than one boundary node and at least one fixed node on the surface geometry that is not a boundary node, wherein the model is designed by a user using a Computer-Aided Engineering (CAE) system or a Computer-Aided Design (CAD) system;
determining boundary edges of the surface geometry;
determining a boundary edge pair comprising two boundary edges of the surface geometry;
determining fixed node locations on each boundary edge of the boundary edge pair;
generating a node list for each boundary edge of the boundary edge pair, wherein the node list comprises a list of boundary nodes and fixed nodes on the boundary edge;
mapping the nodes in the node list of a boundary edge of the boundary edge pair to the opposing boundary edge;
adding additional nodes to a boundary edge if a distance between two consecutive nodes in the node list is larger than a threshold value;
generating a finite element mesh using the node location of nodes in the node list; and
performing a CAE finite element analysis using the finite element mesh, wherein the CAE finite element analysis is performed by a CAE system.

10. The method of claim 9, wherein adding additional nodes to a boundary edge comprises:
defining a segment of a boundary edge using two nodes from the node list of the boundary edge;
receiving a pre-defined distance;
determining that a length of the segment is larger than the pre-defined distance; and
adding a new node to the node list such that a segment including the new node and one of the other two nodes has a length equaling the pre-defined distance.

11. The method of claim 10, wherein new nodes are added to the node list until each segment of each boundary edge has a length equal to or less than the pre-defined distance.

12. The method of claim 11, wherein the pre-defined distance is a user-defined distance.

13. The method of claim 9, wherein the surface geometry comprises more than one boundary edge pair;

wherein the method further includes identifying each boundary edge pair and adding additional nodes for each boundary edge of each boundary edge pair.

14. The method of claim 9, wherein each boundary edge in the boundary edge pair include the same number of nodes in the node list.

15. A mesh generation system, comprising:
a memory; and
a processor configured to:
receive a surface geometry of a model, the surface geometry including more than one boundary node, wherein the model is designed by a user using a Computer-Aided Engineering (CAE) system or a Computer-Aided Design (CAD) system;
generate a finite element mesh of the model using the one or more boundary nodes of the surface geometry; and
perform a CAE finite element analysis using the finite element mesh, wherein the CAE finite element analysis is performed by a CAE system;
wherein the generation of the finite element mesh occurs via one of a mapped meshing method and a mapped seeding method.

16. The system of claim 15, wherein the mapped meshing method comprises:
determining boundary edges of the surface geometry;
determining curvature information of each boundary edge;
calculating a plurality of node locations on each boundary edge using the curvature information;
determining a mesh adjustment based on the boundary edges to adjust a position of each node location in the surface geometry; and
generating a finite element mesh using the node locations.

17. The system of claim 16, wherein determining the curvature information for a boundary edge comprises:
comparing the distance between edges of a surface convex hull of the boundary edge and the distance between boundary nodes of the boundary edge; and
determining that the boundary edge is curved if the difference in distance is greater than a threshold value.

18. The system of claim 16, wherein determining the mesh adjustment based on the boundary edges comprises:
calculating a direction vector for each node location relative to the boundary of the convex hull of the boundary edges;
adjusting each node location based on the direction vector.

19. The system of claim 15, wherein the surface geometry further comprises at least one fixed node on the surface geometry that is not a boundary node;
wherein the at least one fixed node is used in the mapped seeding method to generate the finite element mesh.

20. The system of claim 19, wherein the mapped seeding method comprises:
determining boundary edges of the surface geometry
determining a boundary edge pair comprising two boundary edges of the surface geometry;
determining fixed node locations on each boundary edge of the boundary edge pair;
generating a node list for each boundary edge of the boundary edge pair, wherein the node list comprises a list of boundary nodes and fixed nodes on the boundary edge;
mapping the fixed nodes of a boundary edge of the boundary edge pair to the opposing boundary edge;
adding additional nodes to a boundary edge if a distance between two consecutive nodes in the node list is larger than a threshold value; and
generating a finite element mesh using the node location of nodes in the node list.

21. The system of claim 20, wherein adding additional nodes to a boundary edge comprises:
defining a segment of a boundary edge using two nodes from the node list of the boundary edge;
receiving a pre-defined distance;
determining that a length of the segment is larger than the pre-defined distance; and
adding a new node to the node list such that a segment including the new node and one of the other two nodes has a length equaling the pre-defined distance.

22. The system of claim 21, wherein new nodes are added to the node list until each segment of each boundary edge has a length equal to or less than the pre-defined distance.

* * * * *